United States Patent Office 3,478,528
Patented Nov. 18, 1969

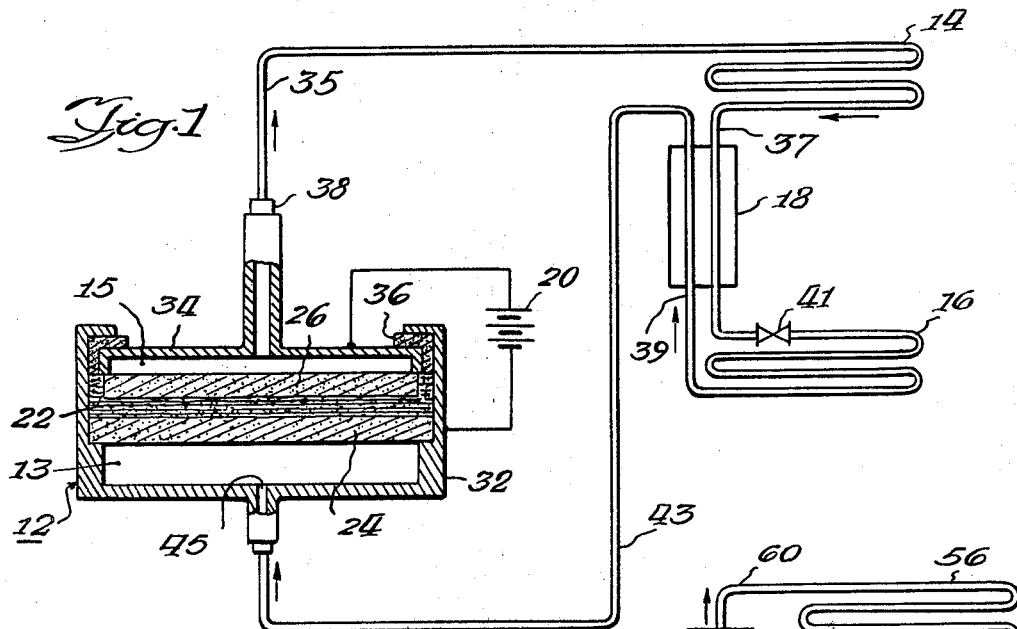
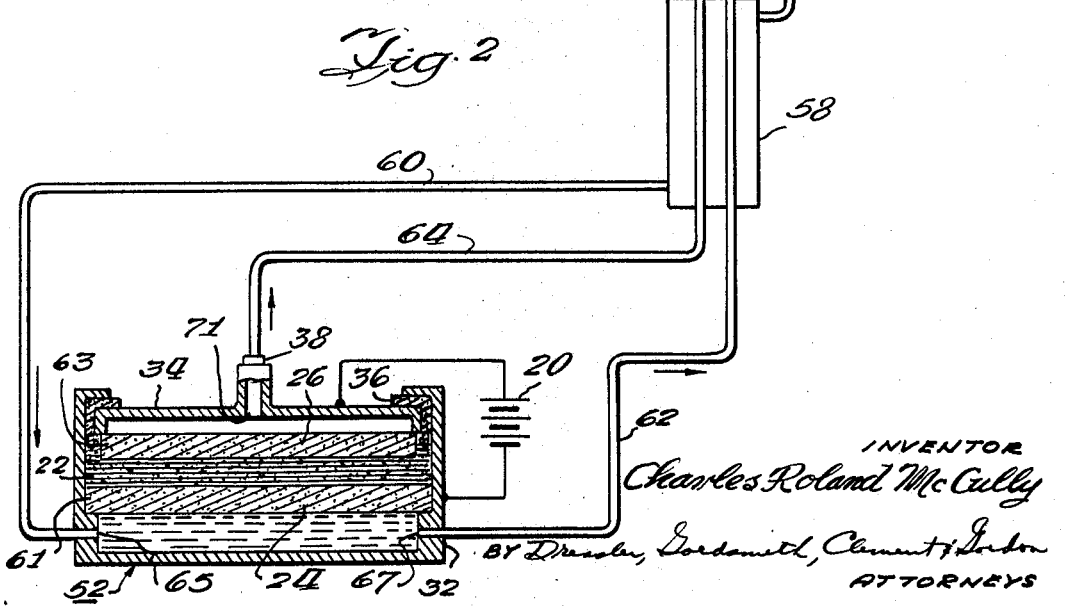

3,478,528
ELECTROCHEMICAL COOLING
Charles Roland McCully, 21 Wildwood Drive S.,
Prospect Heights, Ill. 60070
Filed Jan. 5, 1968, Ser. No. 696,001
Int. Cl. F25b 21/00
U.S. Cl. 62—3                                14 Claims

ABSTRACT OF THE DISCLOSURE

A method for cooling and device for cooling are provided utilizing electrical energy to force an endothermic chemical dissociation reaction to proceed at a temperature below the temperature level at which the reaction could proceed spontaneously. The reaction proceeds in an electrolytic cell on one side of a porous membrane by application of an electrical potential to a chemically combined material. A dissociation product of the reaction is separated from the dissociation reaction zone by passage in an ionized state through the porous membrane and is then deionized by the application of the opposite electrical potential on the other side of the membrane and passed out of the cell.

In a preferred embodiment, the dissociation product passing out of the cell is a condensable vapor at an elevated pressure. In this embodiment, the vapor is condensed with rejection of heat and then evaporated at a lower pressure with absorption of heat before being recycled to the electrolytic cell. Cooling in this embodiment takes place at the evaporator or by the product stream emerging from the evaporator.

In another embodiment, the dissociation product passing out of the cell may be any fluid material since change of state is not relied on for cooling. In this embodiment, the cooling takes place in the electrolytic cell and the dissociation products are recombined in a zone external to the cell so that the exothermic heat of the association reaction may be removed prior to the return of the chemically combined material to the cell.

Background and description of the invention

The utilization of electrical energy to achieve a useful cooling effect is, of course, well known, as evidenced by many millions of electrically operated mechanical refrigerators. In such refrigerators, electrical energy is first converted to mechanical energy by an electric motor and the mechanical energy is then utilized to actuate a refrigeration cycle on a condensable vapor, the cycle comprising compression, condensation, heat removal, decompression and evaporation steps.

In accordance with the present invention electrical energy is used to achieve a useful cooling effect without an intervening conversion to mechanical energy but rather by its ability to effect an endothermic chemical reaction at a temperature level where the reaction cannot take place spontaneously.

There are a number of chemically combined materials which are known to undergo endothermic dissociation or disproportionation reactions as the temperature is raised above the range in which the materials are usually encountered. These reactions are usually reversible with corresponding association or combination reactions, with the rate of association going down and the rate of dissociation going up with increasing temperature until they become equal at the equilibrium temperature. Above the equilibrium temperature, the dissociation reaction predominates, and dissociation can take place spontaneously at these temperatures.

Chemically combined materials of this nature may be chemical compounds in which the constituents are combined in stoichiometric proportions, or may be chemical complexes in which the constituents may be combined in a broad range of proportions.

In this invention endothermic dissociation is carried out below the equilibrium temperature, utilizing electrical energy to force the reaction to go in the desired direction.

In one embodiment of this invention, the endothermic reaction zone is itself a cooling zone used to abstract heat from a material to be cooled.

In another, preferred embodiment, the dissociation reaction produces a condensable vapor as a dissociation product, and the vapor is condensed, lowered in pressure and evaporated as in a conventional refrigeration cycle to produce a cooling effect at the evaporator. In this embodiment an electrolysis cell serves in place of the pump of the conventional refrigeration cycle as a source of high pressure condensable vapor.

The particular embodiments of the present invention are illustrated in the accompanying drawings in which:

FIGURE 1 is a diagrammatic cross-sectional view of the preferred embodiment where cooling takes place at, or immediately following an evaporator; and FIGURE 2 is a diagrammatic cross-sectional view of another embodiment where cooling takes place at an endothermic reaction zone in an electrolytic cell.

The principal components of the system of FIGURE 1 are the electrolytic cell 12, the condenser, or cooler 14, and the evaporator 16. In the electrolytic cell, a porous membrane 22 separates the cell into two sections, 13 and 15 with a porous cathode collector 24 adjacent to the porous membrane in section 13 and a porous anode collector 26 adjacent to the porous membrane in section 15.

The pores of porous membrane 22 are saturated with an electrolyte, typically a mixture of aluminum chloride with alkali metal chlorides; and the pores of the anode collector and cathode collector are wetted, and at least partially saturated, with a liquid comprising the chemically combined material to be dissociated, typically a liquid comprising antimony pentachloride.

The pores of the cathode collector 24 and the anode collector 26 are preferably larger than the pores of the membrane 22 to minimize electrolyte losses by capillarity. The liquid wetting the cathode collector may be the same as the liquid wetting the anode collector, or may be different. In any case, it is preferred to wet the electrode collectors with liquids which are relatively insoluble in the electrolyte so that dilution of the electrolyte in the porous membrane is minimized.

The remaining elements of the cell 12 are the shell 32 which is also the negative terminal, the cap 34 which is also the positive terminal, and the electrical non-conductor 36 which also serves as a pressure seal. The cap 34 is electrically insulated by the non-conductor 38 in line 35 to the condenser 14.

A battery or power supply, 20 is attached to cell 12 to provide an electrical charge on the cathode collector and an opposite charge on the anode collector.

During operation, the antimony pentachloride in the liquid wetting the cathode collector ionizes to some extent producing pentavalent antimony cations and monovalent chloride anions. Electrons from the power supply 20 pass via the shell 32 to the cathode collector 24 and convert the pentavalent antimony cations to trivalent antimony cations which combine with some of the chloride ions to produce antimony trichloride in admixture with the antimony pentachloride.

The excess chloride ions migrate to and through the porous membrane 22 to the anode collector 26 where they are discharged, or deionized, to form chlorine molecules which are collected as a gas at superatmospheric pressure.

The chlorine gas passes through line 35 to condenser 14 where heat is abstracted to an external heat sink, such as ambient air, and the chlorine is liquefied. The liquid chlorine is passed through line 37 and heat exchanger 18 where it is cooled by indirect heat exchange with cold chlorine in line 39 coming from a source described below.

The cooled liquid chlorine is reduced in pressure by passage through expansion valve 41 and evaporation takes place in evaporator 16 with cooling provided equivalent to the latent heat of vaporization of the chlorine.

The revaporized chlorine gas is passed through line 39, heat exchanger 18 and line 43 to inlet 45 of section 13 of the electrolytic cell and is adsorbed into the wetted liquid film on the cathode collector. The chlorine thus added reacts with the antimony trichloride produced in the dissociation reaction to reconstitute the original antimony pentachloride and thus complete the cycle.

Any material which is to be cooled by the system of FIGURE 1 may be brought into indirect heat exchange with cold chlorine gas, either at the evaporator or at a point in the cycle following the evaporator.

In a typical operation of the embodiment of FIGURE 1, chlorine gas enters section 13 of the electrolytic cell at a pressure of about 1.28 atmospheres, a temperature of about 150° F. and an enthalpy of about 240 B.t.u./lb. The exothermic reaction of chlorine and antimony trichloride maintains the temperature in the cathode collector at about 302°–320° F.

The equilibrium temperature for the reaction:

$$SbCl_5 \rightleftharpoons SbCl_3 + Cl_2$$

is about 300° C. (572° F.) at about atmospheric pressure, so it may be seen that the dissociation reaction cannot proceed spontaneously and would not proceed without the application of the electrical potential across the membrane.

After passing through the porous membrane as chloride ions under an applied potential of 0.21 volt, the chlorine is regenerated in section 15 of the cell and leaves the cell at about 302° F. and 13.8 atmospheres with an enthalpy of 265 B.t.u./lb.

In the condenser the chlorine is condensed to a liquid at 160° F. losing sufficient heat in the process to bring its enthalpy down to 149 B.t.u./lb.

The liquid chlorine is cooled to about 120° F. in the heat exchanger and then reduced in pressure and revaporized, emerging from the evaporator at 1.28 atmospheres and −18.4° F. Passage through the heat exchanger raises the temperature of the chlorine gas to 150° F. for recycle to the electrolytic cell.

In the embodiment of FIGURE 2, the principal components of the system are an electrolytic cell 52, an absorber 54, a cooler 56, and a heat exchanger, or recuperator 58.

Cell 52 is essentially similar in structure to cell 12 of FIGURE 1, with porous membrane 22, porous cathode collector 24, porous anode collector 26, shell 32, cap 34, nonconductors 36 and 38, and power supply 20 corresponding to the similarly designated elements of FIGURE 1. In FIGURE 2, the sections of the cell separated by the porous membrane are designated as 61 on the cathode side of the cell and 63 on the anode side.

Section 61 has an inlet 65 and an outlet 67, the latter leading to absorber 54 through line 62, heat exchanger 58 and line 69. Section 63 has an outlet 71 leading to absorber 54 through line 64, heat exchanger 58 and line 73. In the absorber the respective streams from lines 69 and 73 are blended and reacted.

The product from absorber 54 is returned to section 61 of the electrolytic cell through line 60, cooler 56 line 75, heat exchanger 58 and line 60.

In operation, section 61 is filled with a fluid reaction mixture comprising a chemically combined material maintained below its equilibrium temperature for spontaneous dissociation. Under the influence of the potential applied by power source 20 across mebrane 22, a portion of the chemically combined material dissociates, producing at least two dissociation products, at least one of which is ionized. The dissociation reaction in endothermic and is the predominant reaction in section 61 since in this embodiment, the exothermic association reaction is carried out in a separate zone outside the cell, as discussed below.

The ionic dissociation product passes through membrane 22 to section 63 where it is deionized by the opposite charge of the potential applied by the power source 20 and passes out of the cell through outlet 71.

The remaining dissociation product becomes part of the reaction mixture in section 61; and a portion thereof is passed out of section 61 through outlet 67.

Both the outlet stream in line 64 and the outlet stream in line 62 are warmed in heat exchanger 58 by indirect heat exchange with a product stream produced as described below.

In absorber 54 the separate product streams are recombined and an exothermic association reaction takes place, reconstituting the chemically combined starting material for recycle back to the cell. Prior to return to the cell, however, a substantial amount of the exothermic heat of reaction is rejected from the system in cooler 56 where the reaction product is in indirect heat exchange with a heat sink such as ambient air. The temperature of the reaction product is further lowered in heat exchanger 58 prior to return to the electrolytic cell.

In the system of FIGURE 2, the material to be cooled is brought into indirect heat exchange with the endothermic dissociation zone of the electrolytic cell. Heat transfer may be effected by providing fins (not shown) on shell 32, or by passing the material to be cooled into and through the endothermic reaction space through heat exchange coils therein.

In an example of operation of the invention in the mode illustrated in FIGURE 2, the electrolyte in the porous membrane comprises thionyl chloride with 2–5 mol percent of a mixture of aluminum chloride and alkali metal chlorides. The chemically combined material subjected to dissociation is a complex of chlorine and thionyl chloride. Operation of the electrolytic cell gives gaseous chlorine at the anode and depletes the chlorine content from the complex at the cathode.

The injection of chlorine into the chlorine-depleted thionyl chloride in the absorber with the release of exothermic heat results in gravity gradients which provide the circulation in the liquid system.

Cell operation in this system is typically at 0.2 volt and −10° C. Heat rejection from the system is at a temperature of about 60° C.

The temperature in section 61 of the cell is at a sufficiently low temperature to provide useful cooling at the cell, itself; and ambient air may be used as the heat sink.

In the construction of the cells of both FIGURE 1 and FIGURE 2, the porous membrane 22 may be a ceramic membrane, but is preferably a non-woven fibrous matte of a chemically inert, electrically non-conductive material such as glass or asbestos. In a particularly preferred embodiment, an inert resin, such as polytetrafluoroethylene, is used as a binder for the fibrous matte, but the amount of such a resin is not so great as to impair the wettability of the matte to the electrolyte.

The electrolyte in the porous membrane is selected to meet the requirements of the endothermic dissociation system used, and is preferably a mixture containing ions of the nature of those to be transported.

When chloride ions are to be transported in a nonaqueous system, the electrolyte is suitably a solution of one or more alkali metal chlorides in aluminum chloride, most suitably at proportions at or near eutectic proportions, so that the composition remains liquid at temperatures not much higher than ambient temperatures.

A particularly useful electrolyte composition for a cell employing the dissociation of antimony pentachloride as the endothermic dissociation reaction is one which approximates 50.2 mole percent of aluminum chloride, 17 mole percent of potassium chloride, 15.4 mole percent of sodium chloride, 15.0 mole percent of lithium chloride and 2.4 mole percent of tetramethylammonium chloride.

For most applications, it is preferred to have the porous membrane 22 sandwiched between porous electrode collectors, as shown in the figures. The electrode collectors may be similar to each other or dissimilar. Typically, the electrode collectors are made of chemically inert, electrically conductive materials, such as graphite, carbon, nickel, Monel and tantalum.

The collectors may be made by weaving or felting when the materials are in fiber form, or by bonding with a fluorocarbon resin binder when the materials are in particulate form. As stated above, the pore size of the collectors is preferably greater than the pore size of the porous membrane so that electrolyte in the membrane is not lost by capillarity.

While the invention has been described above with respect to particular dissociation reaction systems, it will be understood by those skilled in the art that the invention is applicable to any reversible reaction system which involves endothermic dissociation and which may be directed toward the dissociation reaction by the imposition of an electrical charge.

It is also desirable to have a system in which the chemically combined material and the dissociation products are in fluid phase (either liquid or gaseous). However, systems involving starting materials or products which are not fluid phase materials, per se, may be used by the employment of suitable solvents. The solvents may be selected to suit the particular materials involved in the system and may be either organic or inorganic, the latter including aqueous solvents.

Among the reaction systems that will be suggested to those skilled in the art are those involving the dissociation of other pentahalides of antimony, tin tetrachloride, tellurium tetrachloride, cupric iodide, uranium hexachloride, phosphorus pentachloride, silver peroxide, manganese dioxide, mercurous chloride, vanadium trichloride and trifluoride, lithium hydride, calcium hydride and calcium ammine $[Ca(NH_3)_6]$.

In some instances there may be simultaneous migration of two oppositely charged ionic dissociation products across the porous membrane in opposite directions. Lithium hydride, for example, may be dissociated on both sides of the membrane with lithium ions migrating from cathode to anode to gain an electron while hydride ions migrate from anode to cathode to lose an electron.

In some instances a suitable dissociation reaction may involve as the chemically combined material a metallic compound in which the metal is at an intermediate valence rather than in its most highly oxidized state. In some cases, the dissociation of such a compound may involve the simultaneous production of both higher and lower valence states (disproportionation). Thus, vandium trichloride may produce vandium dichloride and vanadium tetrachloride in a reaction which is endothermic. Such a reaction system is a suitable endothermic dissociation reaction for the purposes of this invention.

What is claimed is:

1. A method of cooling which comprises maintaining a cyclic flow of material to an electrolytic cell, through a porous membrane in said cell and from said cell, absorbing heat into said material at at least one point in said cycle and rejecting heat from said material at a point external to said cell, said material passing through said membrane being an ionized material derived from an endothermic dissociation of a chemically combined material by the application of an electrical potential thereto at a temperature below its equilibrium temperature, said equilibrium temperature being the temperature above which said chemically combined material is capable of spontaneous endothermic dissociation, and at least a portion of said material flowing from said cell being a deionized dissociation product of said chemically combined material.

2. The method of claim 1 wherein said material flowing from cell is a material in vapor state, and said vapor state material is liquefied and revaporized prior to return to said cell in vapor state.

3. The method of claim 2 wherein said heat rejection takes place during said liquefaction step and said absorption of heat takes place during said revaporization step.

4. The method of claim 2 wherein said liquefied vapor state material passing to said revaporization step is in heat exchange with the vapor state material passing from said revaporization step.

5. The method of claim 1 wherein said endothermic dissociation takes place on the cathode side of an electrical potential imposed across said membrane.

6. The method of claim 1 wherein said chemically combined material is a compound maintained in liquid phase, said compound being a pentahalide of antimony.

7. The method of claim 6 wherein said compound is antimony pentachloride and said deionized dissociation product is gaseous chlorine.

8. The method of claim 1 wherein a second dissociation product of said chemically combined material is withdrawn from said electrolytic cell, wherein said dissociation products are recombined externally of said electrolytic cell and wherein said material flowing to said cell comprises said recombined dissociation products.

9. The method of claim 8 wherein said heat rejection step takes place at a point in said cycle after said recombination step and wherein heat is absorbed directly into said cell.

10. The method of claim 8 wherein at least one of said dissociation products flowing to said recombination step is in indirect heat exchange with said recombined dissociation products flowing from said recombination step.

11. A cooling device comprising an electrolytic cell having at least one porous membrane separator therewithin, a conduit external to said cell for passage of material out of said cell on a first side of said membrane and for passage of material into said cell on a second side of said membrane, a portion of said conduit being in indirect heat exchange with a heat sink, and a source of electromotive force connected across said membrane between two porous electrode collectors adjacent thereto.

12. The device of claim 11 wherein a portion of said external conduit is in indirect heat exchange with at least one other portion thereof.

13. The device of claim 11 wherein said external conduit includes a condenser, a pressure reducing means and an evaporator.

14. The cooling device of claim 11 wherein said external conduit includes an absorber and a cooling coil and wherein a second conduit provides for passage of material from said first side of said membrane to said absorber.

References Cited

UNITED STATES PATENTS

| | | | |
|---|---|---|---|
| 651,827 | 6/1900 | Coleman | 62—3 |
| 1,717,584 | 6/1929 | Ruben | 62—3 |
| 1,847,671 | 3/1932 | Ruben | 62—3 |
| 2,044,750 | 6/1936 | Bryant | 62—3 |
| 2,635,431 | 4/1953 | Bischowsky | 62—3 |
| 3,267,683 | 8/1966 | Nesbitt | 62—3 |

WILLIAM J. WYE, Primary Examiner

U.S. Cl. X.R.

62—4